US 6,708,152 B2

(12) United States Patent
Kivimäki (10) Patent No.: US 6,708,152 B2
(45) Date of Patent: Mar. 16, 2004

(54) USER INTERFACE FOR TEXT TO SPEECH CONVERSION

(75) Inventor: Mika Kivimäki, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 445 days.

(21) Appl. No.: 09/739,792

(22) Filed: Dec. 20, 2000

(65) Prior Publication Data

US 2001/0014860 A1 Aug. 16, 2001

(30) Foreign Application Priority Data

Dec. 30, 1999 (GB) .............................................. 9930745

(51) Int. Cl.[7] .............................................. G10L 13/08
(52) U.S. Cl. ...................................... 704/260; 704/270
(58) Field of Search ................................. 704/235, 258, 704/260, 270, 275, 270.1; 379/88.01

(56) References Cited

U.S. PATENT DOCUMENTS

| 4,831,654 | A | * | 5/1989 | Dick ........................... 381/51 |
| 5,832,435 | A | * | 11/1998 | Silverman ................... 704/260 |
| 5,850,629 | A | | 12/1998 | Holm et al. ................. 704/260 |
| 5,890,117 | A | * | 3/1999 | Silverman ................... 704/260 |
| 6,085,161 | A | * | 7/2000 | MacKenty et al. .......... 704/270 |
| 6,088,675 | A | * | 7/2000 | MacKenty et al. .......... 704/270 |
| 6,108,629 | A | * | 8/2000 | Kasday ....................... 704/258 |
| 6,246,983 | B1 | * | 6/2001 | Zou et al. ................... 704/260 |
| 6,353,661 | B1 | * | 3/2002 | Bailey, III ................ 379/93.25 |
| 6,356,819 | B1 | * | 3/2002 | Winslow ...................... 701/23 |
| 6,442,523 | B1 | * | 8/2002 | Siegel ......................... 704/270 |
| 6,462,732 | B2 | * | 10/2002 | Mehr .......................... 345/169 |

FOREIGN PATENT DOCUMENTS

| EP | 0598598 A1 | 11/1993 |
| EP | 0598599 A1 | 11/1993 |
| JP | WO9737344 | 10/1997 |
| WO | WO0019408 | 4/2000 |

* cited by examiner

Primary Examiner—Susan McFadden
(74) Attorney, Agent, or Firm—Antonelli, Terry, Stout & Kraus, LLP (57) ABSTRACT

An electronic device which comprises a speech synthesizer including a loudspeaker, arranged to convert an input dependent upon punctuated text, to an audio output representative of a human vocally reproducing the text. It also comprises a user input device for inputting instructions to navigate through text, between positions defined by punctuation identifiers of the text, to a desired position, and a controller arranged to control navigation to the desired position and provide the speech synthesizer with an input corresponding to a portion of the text from the desired position, in response to input navigation instructions.

63 Claims, 8 Drawing Sheets

| TEXT | SPACE COUNT (ASCII 32) | GROUP |
|---|---|---|
| | 91 | 92 |
| HELLO | | 1 |
| | 1 | |
| FRED | | 1 |
| | 2 | |
| THANK | | 1 |
| | 3 | |
| YOU | | 1 |
| | 4 | |
| FOR | | 1 |
| | 5 | |
| YOUR | | 2 |
| | 1 | |
| MAIL | | 2 |
| | 2 | |
| I | | 2 |
| | 3 | |
| LOOK | | 2 |
| | 4 | |
| FORWARD | | 2 |
| | 5 | |
| TO | | 3 |
| | 1 | |
| SEEING | | 3 |
| | 2 | |
| YOU | | 3 |
| | 3 | |
| AT | | 3 |
| | 4 | |
| 2 | | 3 |
| | 5 | |
| O'CLOCK | | 4 |
| | 1 | |
| ON | | 4 |
| | 2 | |
| THURSDAY | | 4 |
| | 3 | |

FIG. 9(a)

|  | COMPARISON | GROUP |
|---|---|---|
| HELLO | | 1 |
| FRED | | 1 |
| , | ✓ | |
| THANK | | 2 |
| YOU | | 2 |
| FOR | | 2 |
| YOUR | | 2 |
| MAIL | | 2 |
| . | ✓ | |
| I | | 3 |
| LOOK | | 3 |
| FORWARD | | 3 |
| TO | | 3 |
| SEEING | | 3 |
| YOU | | 3 |
| LATER | | 3 |
| . | ✓ | |
| IS | | 4 |
| 2 | | 4 |
| O'CLOCK | | 4 |
| OK | | 4 |
| ? | ✓ | |

FIG. 9(b)

USER INTERFACE FOR TEXT TO SPEECH CONVERSION

BACKGROUND OF THE INVENTION

The present invention relates to user interface for a device which provides text to speech synthesis.

The synthesis of human speech using electronic devices is a well developed and published technology and various commercial products are available. Typically speech synthesis programs convert written input to spoken output by automatically generating synthetic speech and speech synthesis is therefore often referred to as "text-to-speech" conversion (TTS).

There are several problems in speech synthesis which, as yet, have not been satisfactorily resolved. One problem is the difficulty in comprehension of the synthetic speech by a user. This problem may be exacerbated in mobile electronic devices such as mobile telephones or pagers which may have limited processing resources.

It would be desirable to improve the level of comprehension a user has of the speech output from such speech synthesiser systems.

SUMMARY OF THE INVENTION

According to one aspect of the present invention, there is provided an electronic device comprising a speech synthesizer including a loudspeaker, arranged to convert an input dependent upon punctuated text, to an audio output representative of a human vocally reproducing the text; a user input device for inputting instructions to navigate through text, between positions defined by punctuation identifiers of the text, to a desired position; and a controller arranged to control navigation to the desired position and provide the speech synthesizer with an input corresponding to a portion of the text from the desired position, in response to input navigation instructions.

Such a device provides the user with a means for navigating through text thereby selecting desired portions to be output audibly by the speech synthesizer. Further, since the navigation is between punctuation identifiers, the portions of text are split logically, enabling the user to put individual words into context more easily. Thus, the intelligibility of the audio output by the user is improved.

The punctuation identifiers may be punctuation marks provided in the text, and/or other markers. The electronic device may use punctuation identifiers which identify the beginning of sentences, such as a full-stop (period), exclamation mark, question mark, capital letter, consecutive spaces. Alternatively, the punctuation identifiers may be marks such as a comma, colon, semi-colon, or dash which are also used to separate words in text into logical units. Also, the input text can include special characters for this purpose. The creator of the text may, for example, use special characters to mark words which may be difficult and thus need to be replayed, when he foresees intelligibility problems.

The electronic device may comprise a display for presenting a text portion which the user can refer to confirm the user's understanding of the audio output.

The device may be arranged to navigate backwards through the text, thereby providing a function for repeating a portion of text. The device may respond to a repeat or backwards command input by a user, by the controller navigating backwards to a position defined by a predetermined punctuation identifier so as to repeat the portion of text from that position.

The predetermined punctuation identifier may be the first punctuation identifier in the backwards sequence or alternatively a second or further punctuation identifier in the backwards sequence. However, preferably the navigation depends on how quickly the repeat command is made after the audio output corresponding to the first punctuation identifier in the backwards sequence. According to such an embodiment, the device may determine this based on the length of text and/or the length of time for audible reproduction of the text between the current position and the position defined by the first punctuation identifier in the backwards sequence. If the length is below a threshold (such as five words, for example, or two seconds), the controller is arranged to navigate backwards to a position defined by the second punctuation identifier in the backward sequence.

The speech synthesizer may repeat the text more slowly than a default speed. This has the advantage of further improving the comprehensibility of the repeated synthesized speech. If the device comprises a display, the default speed may be that of the display of text on the display. Alternatively, the default speed may be the normal speed of the output by the speech synthesizer.

Alternatively, or in addition to the backward navigation, the device may be arranged to navigate forwards through the text. In this way, it can jump forwards past a portion of the text. The device responds to a forward or skip command input by a user, by the controller navigating forwards to a position defined by a predetermined punctuation identifier, so as to skip the portion of text between the current position and that position. In other words, it jumps to provide an audio output from the position defined by that predetermined punctuation identifier.

The predetermined punctuation identifier may be the first punctuation identifier in the forward sequence or alternatively a second, or a further, punctuation identifier in the forward sequence. However, preferably the navigation depends on how soon the audio output corresponding to the next punctuation identifier would occur in the absence of the skip command. According to such an embodiment, the device may determine this based on the length of text and/or the length of time for audible reproduction of the text between the current position and the position defined by the first punctuation identifier in the forward sequence. If the length is below a threshold, the controller is arranged to navigate forwards to a position defined by a second punctuation identifier in the forward sequence.

There are a number of ways in which a user can input instructions. In one embodiment, the user may input instructions via a user input comprising a key means. The key means may be a user actuable device such as a key, a touch screen of the display, a joystick or the like, The key means may comprise a dedicated instruction device. If the device provides for forward and backward navigation, then it may comprise separate dedicated navigation instruction devices. That is, one for forward navigation, and one for backward navigation.

The control means may determine the number of device actuations and determine the position of the punctuation identifier associated with that number of actuations. For example, pressing the dedicated key associated with backward navigation instruction two times could cause the device to navigate to a position of the punctuation identifier two back.

Alternatively, the position of punctuation identifier may be determined on the length of time the dedicated key is depressed.

Alternatively, the key means may comprise a multi-function key. One function of this key is selecting a navigation instruction. The navigation instruction itself may be provided by the user inputting it, or via a menu option. In either case, the multi-function key is used to select the navigation instruction.

Instead of, or in addition to the key means, the user input device may comprise a voice recognition device. Such a voice recognition device typically provides navigation instructions by way of a voice command.

The electronic device may be a document reader, a portable communications device, a handheld communications device, or the like.

According to another aspect of the present invention there is provided a portable radio communications device comprising a speech synthesizer including a loudspeaker, arranged to convert an input dependent upon punctuated text, to an audio output representative of a human vocally reproducing the text; a user input device for inputting instructions to navigate through text, between positions defined by punctuation identifiers of the text, to a desired position; and a controller arranged to control navigation to the desired position and provide the speech synthesizer with an input corresponding to a portion of the text from the desired position, in response to input navigation instructions.

The device may further comprise means for mounting in a vehicle.

According to a further aspect of the invention, there is provided a document reader comprising a speech synthesizer including a loudspeaker, arranged to convert an input dependent upon punctuated text, to an audio output representative of a human vocally reproducing the text; a user input device for inputting instructions to navigate through text, between positions defined by punctuation identifiers of the text, to a desired position; and a controller arranged to control navigation to the desired position and provide the speech synthesizer with an input corresponding to a portion of the text from the desired position, in response to input navigation instructions.

These devices may be provided in a car. If so, and if the device comprises key means, these are preferably provided on the steering wheel of the car.

According to yet another aspect of the present invention there is provided a method of navigating through text to a desired position for audio output by a speech synthesizer, the method comprising detecting instructions input by a user to navigate through text, between positions defined by punctuation identifiers of the text, to a desired position; controlling navigation to the desired position; and providing the speech synthesizer with an input corresponding to a portion of the text from the desired position.

According to a still further aspect of the present invention there is provided a method for providing speech synthesis of a desired portion of text, the method comprising determining a desired start position from a selection defined by punctuation identifiers, from an instruction input by a user; moving to the desired start position; outputting speech synthesized text from that position.

BRIEF DESCRIPTION OF THE DRAWINGS

Embodiments of the present invention will now be described by way of example with reference to the accompanying drawings, of which.

DETAILED DESCRIPTION OF THE INVENTION

Figure 1:
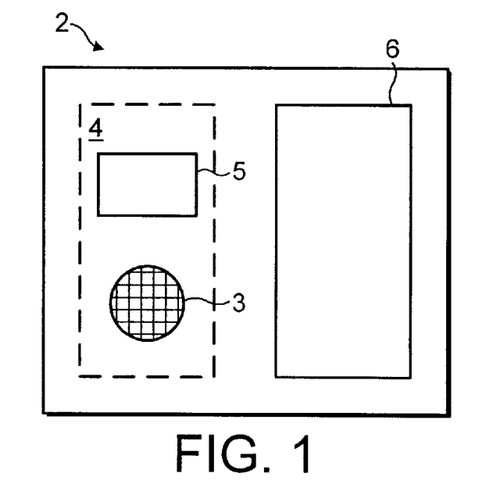
FIG. 1 illustrates an electronic device with a user interface having an input device and loudspeaker.

FIG. 1 illustrates an electronic device 2. The electronic device has an input device 4 and an output device 6. The input device comprises a microphone 3 for receiving an audio input and a tactile input device 5. The output 6 is a loudspeaker 6 which is used to broadcast synthesized speech to a user.

The input device may receive instructions from the user controlling selection of the synthesized speech to be output by the loudspeaker 6. This may be performed either by way of a tactile input and/or a voice command. For example, the user who did not hear a portion of the speech output by the loudspeaker 6 can instruct the device 2 to replay that portion, thereby improving the user's comprehension. The tactile input device 5 may also be used to input text which may be broadcast by the loudspeaker 6 as synthesized speech.

The electronic device may be any device which requires an audio interface. It may be a computer (for example, personal computer PC), personal digital assistant (PDA) a radio communications device such as a mobile radio telephone e.g. a car phone or handheld phone, a computer system, a document reader such as a web browser, a text TV, a fax, a document browser for reading books, emails or other documents of the like.

Although the input device 4 and loudspeaker 6 in FIG. 1 are shown as being integrated in a single unit they may be separate, as may be microphone 3 and text input device 5 of the input device 4.

Figure 2:
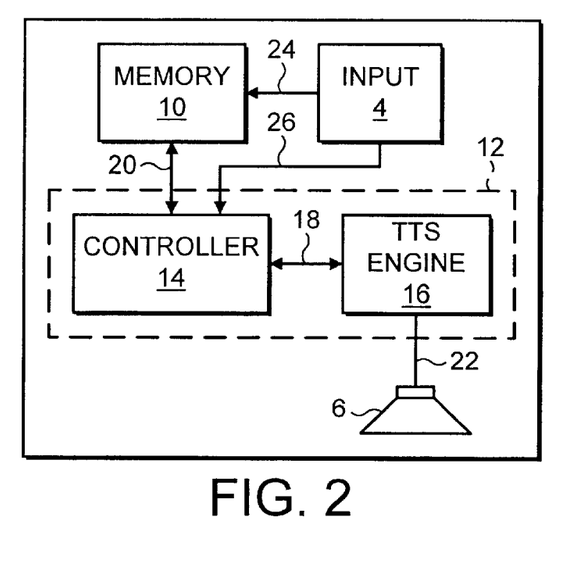
FIG. 2 is a schematic illustration of the components of the electronic device illustrated in FIG. 1.

FIG. 2 is a schematic illustration of the electronic device 2. The device 2, in addition to having the input device 4 and the loudspeaker 6 has a processor 12 which is responsive to user input commands 26 for driving the loudspeaker and for accessing a memory 10. The memory 10 stores text data 24 supplied via an input 4. The processor 12 is illustrated as two functional blocks—a controller 14 and a text-to-speech engine 16. The controller 14 and text-to-speech engine 16 may be implemented as software running on the processor 12.

The text-to-speech engine 16 drives the loudspeaker 6. It receives the text input 18 from the controller and converts the text input to a synthetic speech output 22 which is transducer by the loudspeaker 6 to soundwaves. The speech output may, for example, be a certain number of words at a time, one phrase at a time or one sentence at a time.

The controller 14 reads the memory 10 and controls the text-to-speech engine 16. The controller having read text data from the memory provides it as an input 18 to the text-to-speech engine 17.

The memory 10 stores text data which is read by the controller 14. The controller 14 uses the text data to produce the input 18 to the text-to-speech engine 17. Text data is stored in the memory 10 by the input device 30. The input device in this example includes a microphone 3, a key means 5 (such as a key, display touch screen, joystick etc.) or a radio transceiver for receiving text data in the form of SMS messages or e-mails.

The controller 14 also navigates through the text data in response to instructions 26 received from the user via input 4, so that the loudspeaker outputs the desired speech. Navigation may, for example, be forwarded to skip text or backwards to replay text. The navigation is performed so that the text is broadcast by the loudspeaker 16 in logical units. This is achieved by the controller parsing text it accesses from the memory 10. Parsing involves using punctuation identifiers within the text to separate portions of the text into logical units. Examples of punctuation identifiers are those which indicate an end of sentence such as a full stop (period) exclamation mark, question mark, capital letter, consecutive spaces, comma and other identifiers which indicate a logical break within the sentence, such as the comma, colon, semi-colon or dash. Alternatively, it may involve a punctuation identifier which indicates an end of a group of a predetermined number of words. The portion of the text between identifiers is sent one at a time to the US engine 16. The controller maintains the database to enable control of the navigation. Examples are shown in FIGS. 9*a* and *b* of the accompanying drawings.

Figure 9A:
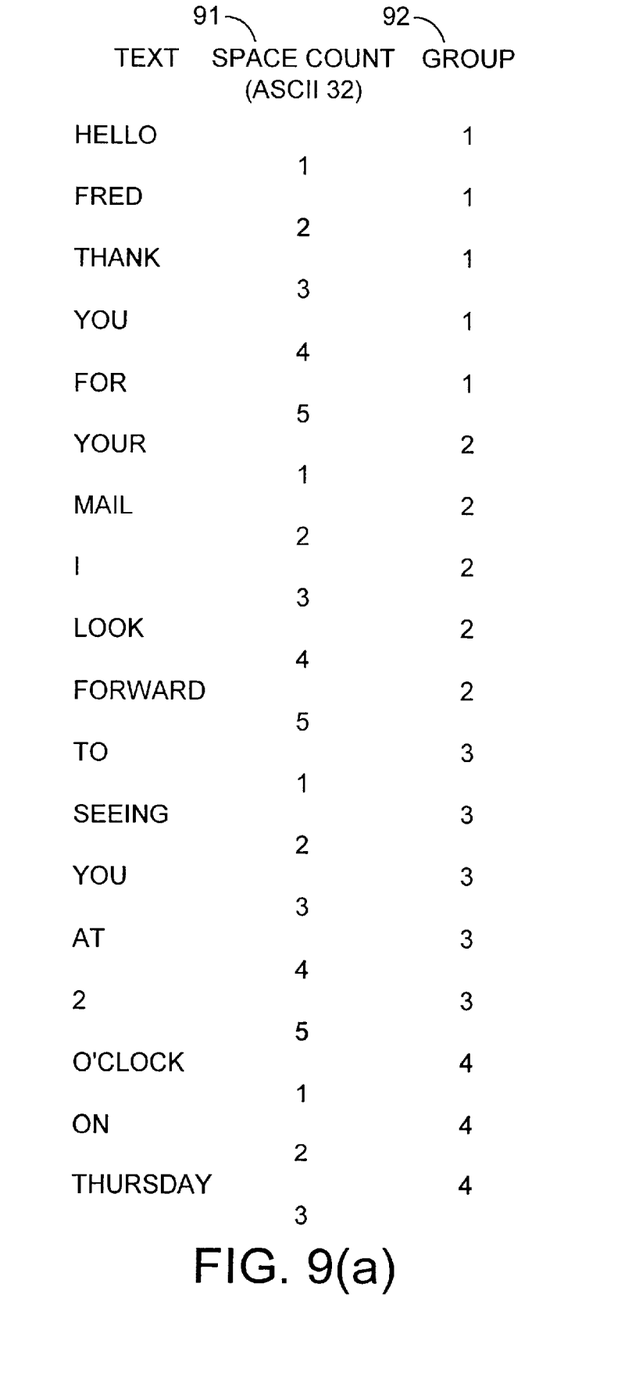
FIGS. 9a and 9b illustrate exemplary databases for controlling navigation.
Figure 9B:
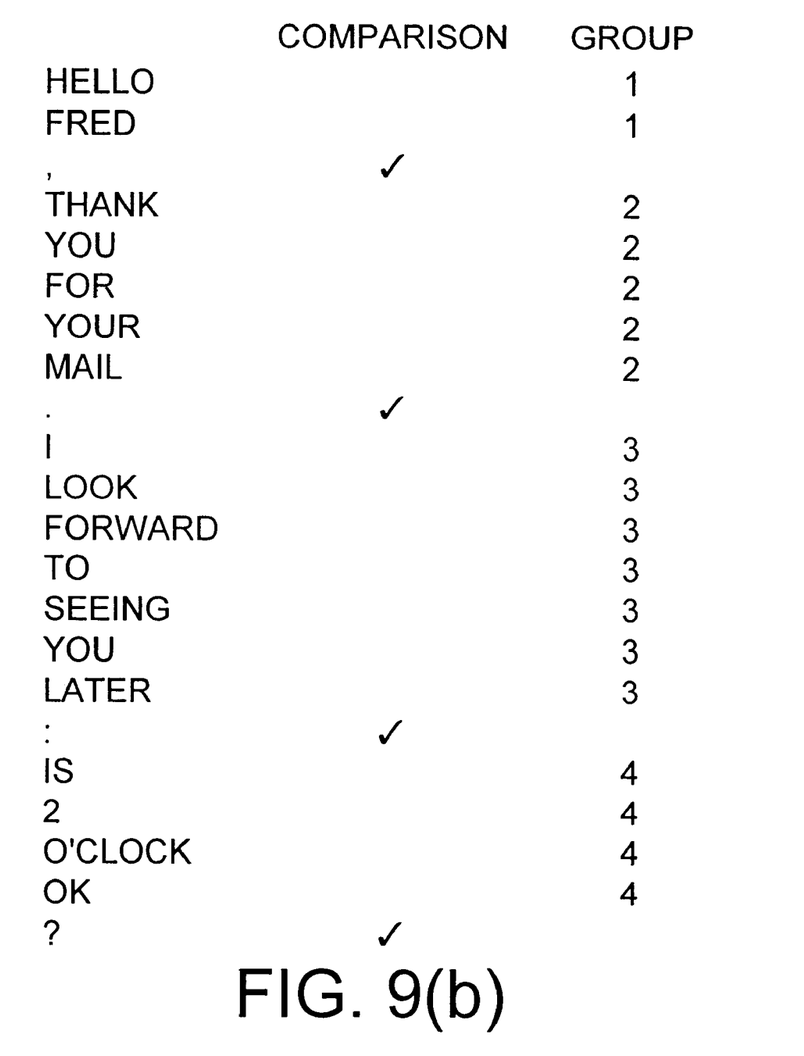

In FIG. 9*a* the controller parses the text into groups of five words. This is useful, for example, where the text contains minimal or no punctuation marks. In this case, the controller groups the words by recognizing space characters within the text and counting them. This may, for example, be done by looking for ASCII for a space character, The database has an entry for each of the 18 words in the phrase. Each entry has two fields. The first field 91 records the count of spaces incrementing from one to five. The second field 92 records which text group the word entry belongs to, based on the count in the first field 91, both storing a text group identifier which is different for each group of five words. Referring to FIG. 9*a*, there are four distinct text groups having group identifiers 1, 2, 3 and 4. Group 1 includes the words "Hello Fred, thank you for". Group 2 includes the words "your mail I look forward". Group 3 includes the words "to see you at two". Group 4 includes the words "o'clock on Thursday".

In operation the controller 14 forwards group 1 to the TTS 18, next group 2, then group 3 and finally group 4. During this time the controller 14 keeps track of which group is successfully output as synthesized speech. It may do this by storing the number of the group identifier forwarded to the TTS 18. If the controller receives the user's instruction, then the controller navigates through the text to a desired position and forwards the associated text group to the TTS engine 16. For example, if the TTS engine is outputting synthesized speech corresponding to group 3, and the user inputs the backwards instruction, then control signal 26 causes the controller to navigate back through the text to the beginning of the last ID group to be output (or forwarded to the TTS), and re-sends that group to the TTS engine 16 for conversion and output by the loudspeaker 6. For example, assuming group 3 is currently being output, then in response to a backwards control signal 26 from the input 4, the controller 18 navigates back through the text to the beginning of group 3, to the word "to", and forwards text group 3 to the TTS engine 16 again for output by the loudspeaker 6 as synthesized speech. Assuming no further instructions are received from the user, then the controller 14 duly forwards the text group 4 to the TTS engine, once the group 3 text is output. The controller 14 may be arranged to move back two groups in response to a backward command. This may occur, for example, if an instruction is received when the beginning of a text group is being output, for example if the first and second words of a group are being output. So if the word "seeing" in group 3, for example, is being output when the controller receives the backward instruction 26, then the controller may navigate back to the beginning of group 2 and forward that group to the TTS for output.

Alternatively, the text replayed may be determined by duration since the last group is sent to the TTS engine before receipt of the backward instruction, or by a specific user input, such as two signals being received within a predetermined period. These alternatives will be explained further below.

Likewise, if a forward instruction is received, the controller 14 navigates through the text and forwards the next group to the TTS engine for speech output by the loudspeaker 6. For example, if group 2 is currently being output as synthesized speech and the user inputs a forward instruction, then control signal 26 causes the controller to navigate forward through the text to the beginning of the next group to be output, namely group 3 and sends that group to the TTS engine for conversion to synthesized speech for output by the loudspeaker. Thereby, the rest of the group 2 text not already output by the loudspeaker is skipped. Alternatively, if the end of group 2 is being output (for example the words "look" or "forward") when a forward instruction is received, then the controller may skip the third group and forward the fourth group to the TTS engine for conversion to speech for output by the loudspeaker 6.

Figure 3:
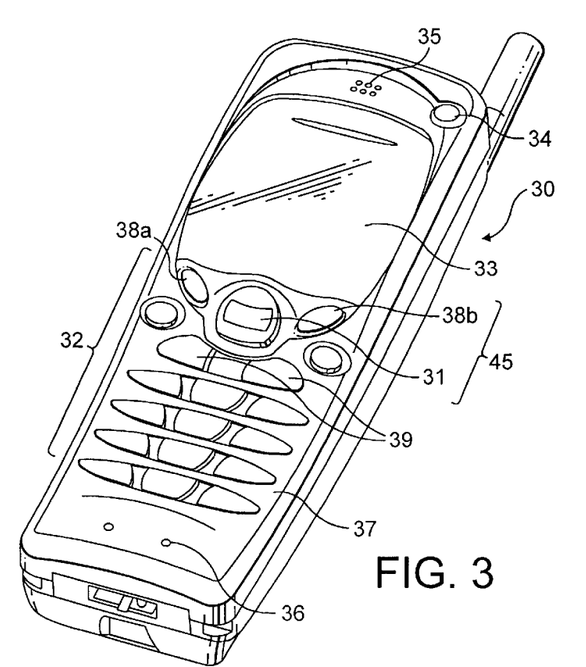
FIG. 3 is a mobile phone according to an embodiment of the present invention.

FIG. 3 illustrates a radio handset according to an embodiment of the present invention. The handset, which is generally designated 30, comprises the user interface having a keypad 32, a display 33, a power key 34, a speaker 35, and a microphone 36. The handset 30 according to this embodiment is adapted for communication via a wireless telecommunication network, for example a cellular network. However, a handset could alternatively be designed for a cordless network. The keypad 32 has a first group of keys 37 which are alphanumeric keys and by means of which the user can input data. For example, the user can enter a telephone number, write a text message (e.g. SMS), write a name (associated with a phone number), etc. using these keys 37. Each of the 12 alphanumeric keys 37 is provided with a figure "0" to "9" or "#" or "*", respectively. In alpha mode, each key is associated with one or more letters and special signs used in text editing. The keypad 32 additionally comprises two soft keys 38*a* and 38*b*, two call handling keys 39, and a scroll key 31.

The two soft keys 8 have functionality corresponding to what is known from a number of handsets, such as the Nokia 2110™, Nokia 6110™ and Nokia 8110™. The functionality of the soft key depends on the state of the handset and the navigation in the menu by using the scroll key, for example. The present functionality of the soft key 38*a* and 38*b* is shown in separate fields in the display 33 just above the keys 38.

The two call handling keys 39 may be used for establishing a call or a conference call, terminating a call or rejecting an incoming call.

The scroll key 31 in this embodiment is a key for scrolling up and down the menu. However other keys may be used instead of this scroll key and/or the soft keys, such as a roller device or the like.

Figure 4:
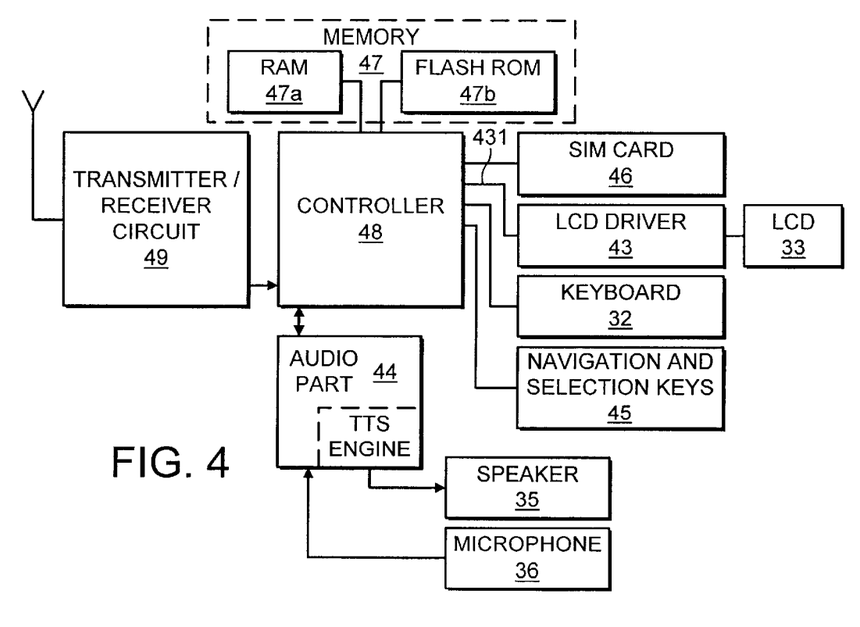
FIG. 4 is a schematic illustration of the components of the mobile phone illustrated in FIG. 3.

FIG. 4 is a block diagram of part of the handset of FIG. 3 which facilitates understanding of the present invention. As is conventional in a radio handset, it comprises speech circuitry in the form of user interface devices (microphone 36 and speaker 35), an audio part 44, transceiver 49, and a controller 48. The microphone 36 converts speech audio signals into corresponding analog signals which in turn are converted from analog to digital by an ND converter (not shown). The audio part 44 then encodes the signal and, under control of the controller 48, forwards the encoded signal to the transceiver 49 for output to the communication network, In the reverse situation, an encoded speech signal which is received by a transceiver 49 is decoded by the audio part again under control of the controller 48. This time the decoded digital signal is converted into an analog one by a D/A converter (not shown), and output by speaker 35.

The controller 48 also forms an interface with peripheral units, such as memory 47 having a RAM memory 47a and a flash ROM memory 47b, a SIM card 46, a display 33 and a keypad 32 (as well as data, power supply, etc).

In this embodiment, the audio part 44 also comprises a TTS engine which, together with the controller 48, form a processor, as in the FIG. 1 embodiment. The device 30 handles text speech synthesis in much the same way as described in connection with the corresponding parts in FIG. 2.

Text may be input by the user via the keyboard 32 and/or microphone 36 or by way of receipt from the communications network by the transceiver 49. The text data received is stored in memory (RAM 47a). The controller reads the memory and controls the TTS engine accordingly. The controller also navigates through the text in response to instructions received from the user via one or more of the microphone 36, keyboard 32 and navigation and selection keys 45, so that the speaker 35 outputs the desired speech in logical units.

In this embodiment, as well as outputting text or speech, the handset also presents text on the display 33. Consequently the processor is responsible for controlling the display driver to drive the display to present the appropriate text. When it reads the memory 47a and controls the TTS engine, the controller 14 also controls the display. Having read text data from the memory, in this embodiment, the controller provides it as an input to the TTS engine and controls the display driver to display the text data used in control signals 431. The displayed text corresponds to the text converted by the US engine. This is also the case when a navigation instruction is received from the user. The database used for controlling navigation is used for the purpose of text output in general, and when the display text is desired the database is used in the control of the display simultaneously with the control of the TTS engine. In other words, in the FIG. 9a database, for example, when the controller sends a text group to the TTS engine, that text group is also sent to the display driver for presentation on the display.

A handset such as that in FIG. 3 would generally have a range of menu functions, The Nokia 6110, for example, can have the following menu functions:
1. Messages
2. Call Register
3. Profiles
4. Settings
5. Call divert.
6. Games
7. Calculator
8. Calendar.

To access the menus, the user can scroll through the functions using the navigation and selection key 45 or using appropriate pre-defined short cuts. In general, the left hand scroll key 38a will enable the user to navigate through sub menus and select options, whereas the right hand soft key 38b will enable the user to go back up the menu hierarchy. The scroll key 31 can be used to navigate through the options list in a particular menu/sub-menu prior to selection using the left hand scroll key 38a.

The messages menu may include functions relating to text messages (such as SMS), voice messages, fax and data calls, as well as service commands from the networks information service messages. A typical function list may be:
1-1 Inbox
1-2 Outbox
1-3 Write Messages
1-4 Message Settings
1-5 Info Service
1-6 Fax or Data Call
1-7 Service Command Editor.

Figure 5A:
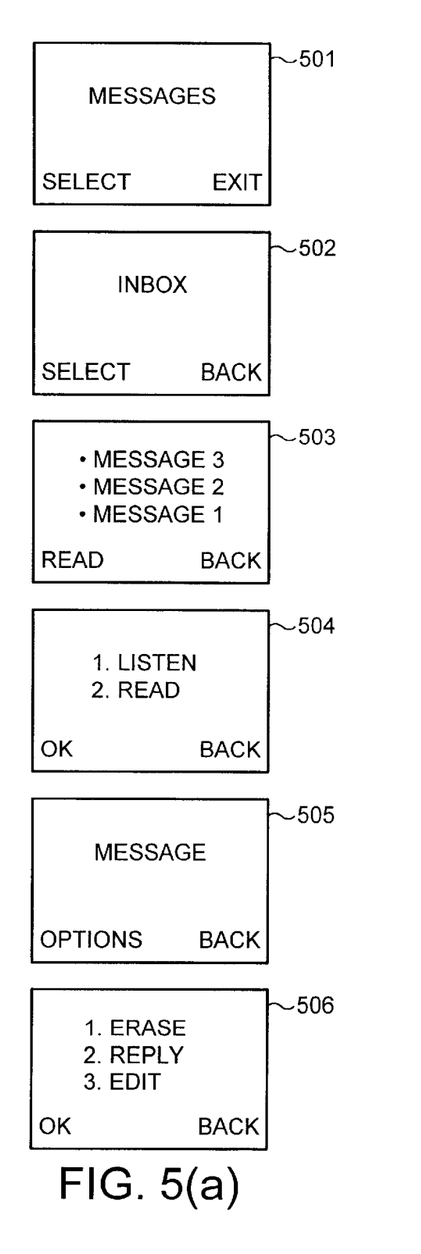
FIGS. 5a and 5b illustrate the selection of navigation commands according to an embodiment of the present invention.
Figure 5B:
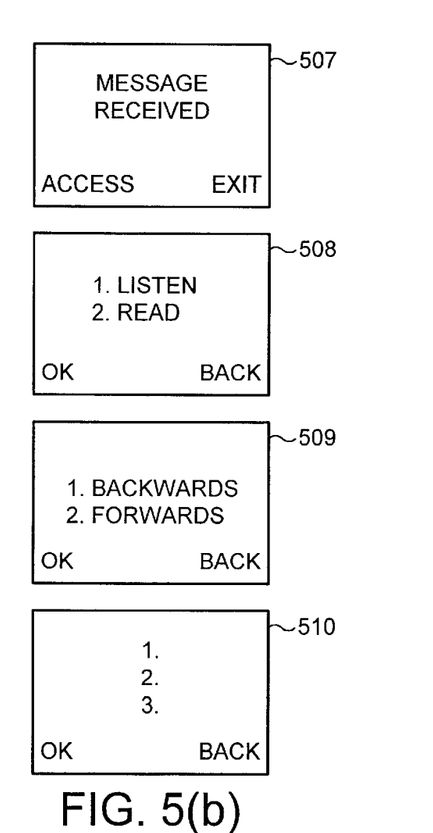

In the present invention, the handset has a setting for text speech synthesis. This setting may be pre-defined or be a profile to be selected by the user. If the setting is "On", then the Inbox message function may comprise options for the user to listen to a received text message etc. FIG. 5a illustrates how a user may select a message stored in the message inbox and listen to it, while FIG. 5b illustrates how to navigate through the message.

In this embodiment, the menu options are displayed one at a time. The messages menu is the first option and is presented on the display (stage 501). The user can select this option by pressing the left scroll key 38a associated with the "select" function displayed. Alternatively, if this option is not desired, the user can use the right hand scroll key to go back to the main menu, or the scroll key to scroll to an alternative option for selection, such as Call Settings.

If the Messages option is selected, the first option in the first sub-menu is displayed, namely Inbox (stage 502). If the user selects this option by pressing the left scroll key 38a, in this embodiment, the last three text messages are displayed, with the last received message being presented first in an options list (stage 503). This last received message is the default option which is selected if the left hand soft key 38a is pressed. This default option may be indicated by being highlighted on the display. If the user wishes to read one of the other messages, the user can navigate to them using the scroll key. Once a message has been selected, the user is given the choice of listening or reading the chosen message. (The listen option may be listen only or listen and read depending on the handset configuration). "Listen" is the default option. This may be chosen by pressing the left hand soft key 38a or the alpha key "1". Alternatively, in a preferred embodiment, the listen option may be automatically selected in the absence of user input after a certain period, for example two seconds. In the embodiment of FIG. 5a, the handset is configured to play and display the selected message if the "Listen" option is selected (stage 505).

A number of further options are available in respect of the selected message depending upon the state of the handset.

If the listen option is selected as in stage 504, then during play of the message, the available options are forward and backward navigation options as described further with respect to FIG. 5b. Once the message has finished playing for a predetermined period without further user input, the options change to conventional text message options such as erase, reply, edit, use number forward, print via IR details etc. (stage 506).

If the read option is selected, then the same options are available irrespective of whether the whole message is presented on the display for the user to read.

Turning now to FIG. 5*b*, this illustrates receipt of an incoming message (rather than accessing one previously received as in stage 503 of FIG. 5*a*).

When a message is received from the communications network via the transceiver 49, the controller sends a control signal to the display driver for the display to present a menu option as shown in stage 507. If the user wishes to access a message while the handset is in this state, then the left soft key 38*a* is pressed. Depression of the right soft key, on the other hand, will exit this menu, and the stored messages can be viewed/listened to later via the stages shown in FIG. 5*a*.

In the FIG. 5*b* embodiment, when the left soft key is pressed the received message is accessed. The user is then given a choice to listen or read the message (stage 508). In this particular embodiment, the handset is configured to only play the message if the listen option is selected (by pressing the left soft key or the alpha numeric key "1"), and consequently the navigation options available are presented on the display (stage 509). The navigation options available in this embodiment are backwards and forwards options, with the backward option being the default. The backwards option may be selected by pressing the left soft key or the alphanumeric key "1", or alternatively automatically when there has been no user input for a predetermined period. The forward option, on the other hand, may be selected by scrolling down once using the scroll key and then selecting using the left hand soft key 38*a*, or more quickly by pressing alphanumeric key "2". If either option is selected, in this embodiment, then a choice of backwards/forwards steps is given (stage 510).

In this case, jumps 1, 2 or 3 are available, and the desired jump may be selected using the appropriate alphanumeric key or the left soft key, following the scroll key if appropriate. The jump by one position backwards or forwards is the default, and may automatically selected if the user doesn't provide any input within a predetermined period. The numbers 1–3 represent the number of jumps between punctuation identifiers in the chosen direction, as for example is described above with reference to FIGS. 9*a* and 9*b*.

As mentioned above, in the FIG. 5*b* embodiment the listen option is listen only and hence once the listen option is selected (stage 508), the backwards and forwards options are presented on the display (stage 509). In contrast, in the FIG. 5*a* embodiment, the listen option is listen and read (play and display) and hence once the listen option is selected, the message is displayed on the display (stage 505).

In the FIG. 5*a* situation when the user selects the listen" option, "options" can be selected using the left soft key 38*a* to present navigation options on the display (as in stage 509 of the FIG. 5*b* embodiment). Likewise, a choice from these options can be made in the same way as for the navigation option of the FIG. 5*b* embodiment (stage 509) and the number of steps, 1, 2 or 3, as in stage 510.

Alternatively, when the message is being played, shortcut keys, alphanumeric keys 1 and 2, can be pressed to automatically select the desired navigation option. Once a navigation option has been selected, the choice of number of backwards/forwards steps is presented to the user as in stage 510 of the FIG. 5*b* embodiment.

Figure 6:
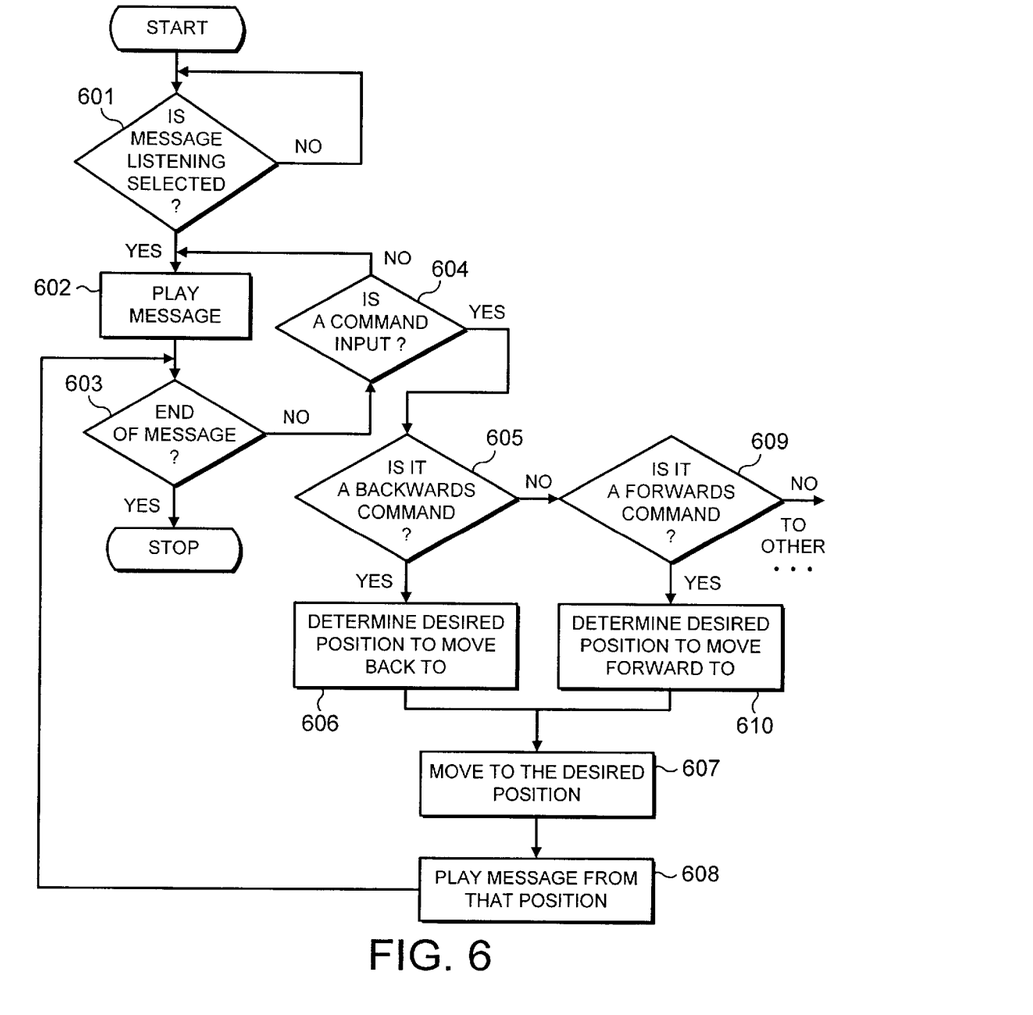
FIG. 6 illustrates the navigation through text and the subsequent output of selective portions of the text.

FIG. 6 illustrates navigation through the text and subsequent output of selective portions of the text. According to this embodiment, the controller 48 determines whether the user has selected the message listening option (step 601). If this is the case, the controller 48 reads text data from the memory 47 and controls the TTS engine to play the stored message over the speaker 35 (step 602). While the message is being played, the controller checks for any input commands from the user (step 604). If no command is detected, then the controller continues to forward the message to the TTS engine until the end of the message is reached (step 603) then playing is stopped. If, on the other hand, the controller detects the input of a command, it determines the type of command. In this embodiment, the controller firstly detects whether the command is a backwards command. If it is, the controller then determines the position to move back to (step 606), moves to that position (step 607), and the US engine plays the message from that position (step 608). For example, the controller identifies a punctuation identifier, reads the message stored in memory from that identifier and forwards that part of the message to the input of the TTS engine for replay.

If the command is not a backwards command, then the controller determines whether the command is a forwards command (step 609). If so, then the controller determines the position to move forward to (step 610), moves to that position (step 607) and the TTS engine plays the message from that position (step 608). For example, the controller identifies the punctuation identifier, jumps to the part of the message from that identifier in the memory and forwards it to the input of the TIS engine for speech output.

Figure 7:
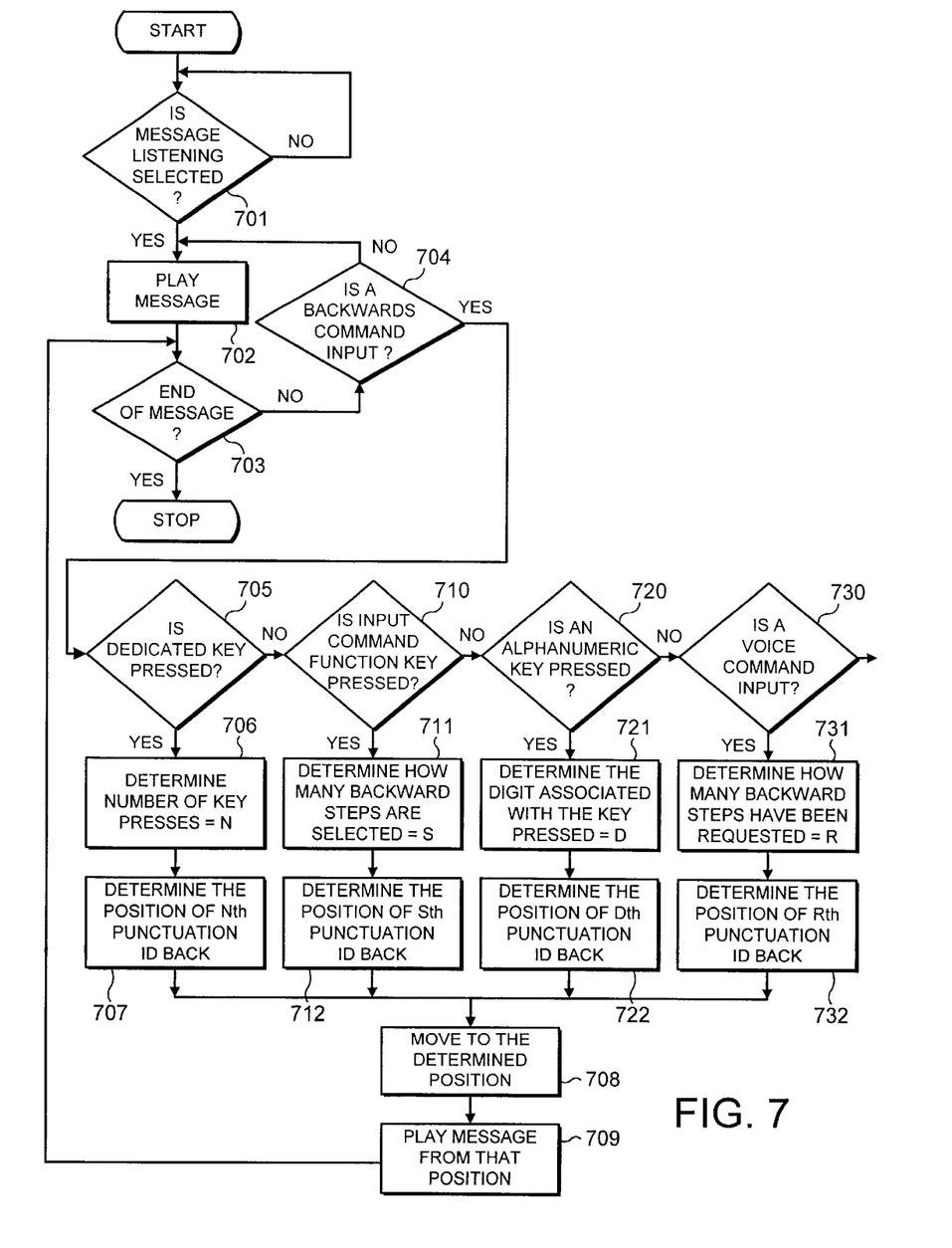
FIG. 7 illustrates various methods of inputting a repeat command.

FIG. 7 illustrates various methods of inputting a repeat command. The controller 48 determines whether the user has selected the message listening option (step 701). If this is the case, the controller 48 reads the text data from the memory 47 and controls the TTS engine to play the stored message over the speaker 35 (step 702). While the message is being played, the controller checks whether a backwards input command has been received from the user (step 704). If no command is detected, then the controller continues to forward the message to the TTS until the end of the message is reached (step 703). Then playing is stopped.

If, on the other hand, the controller detects a backwards input command, it goes on to determine the point from which the message is to be replayed. Four alternatives are illustrated in the flow chart of FIG. 7. These are illustrated as a string of steps in this flow chart, but it will be appreciated that a handset may only implement any one, or any combination, of them.

Firstly, the controller determines whether a dedicated key is pressed (step 705). If so, it goes on to determine how many key presses (N) the user has made (step 706) and determines the position of the Nth punctuation identifier back. For example, if the user presses the dedicated key twice, then the controller determines the position of the second punctuation identifier in the backwards direction from the current position.

Secondly, the controller detects whether a function key corresponding to an input command is pressed. If so, it determines how many backward steps are selected (S) (step 711) and determines the position of the $_5$th punctuation identifier back (step 712). For example, the controller may identify selection of certain number of steps (S) using the scroll key 31 and left soft key 38 as described with reference to stage 510 of FIG. 5(*c*) above.

Thirdly, the controller may determine whether an alphanumeric key is pressed subsequent to a backwards command input (step 720) and if so determines the digit (D) associated with the key press (step 721) and determines the position of the $D^{th}$ punctuation identifier back (step 722).

For example, the controller may detect pressing of the alpha numeric key "1" and determine the position of the previous punctuation identifier on that basis.

Fourthly, the controller may determine whether a voice command is input (step 730), and if so the controller will determine how many backward steps (R) have been requested (731) and thus determine the position of the $R^{th}$ punctuation identifier back. This can be achieved using conventional voice recognition technology.

Once the desired position has been determined, the controller moves back to that position (step 708) and the TTS engine plays the message from that position (step 709).

Figure 8:
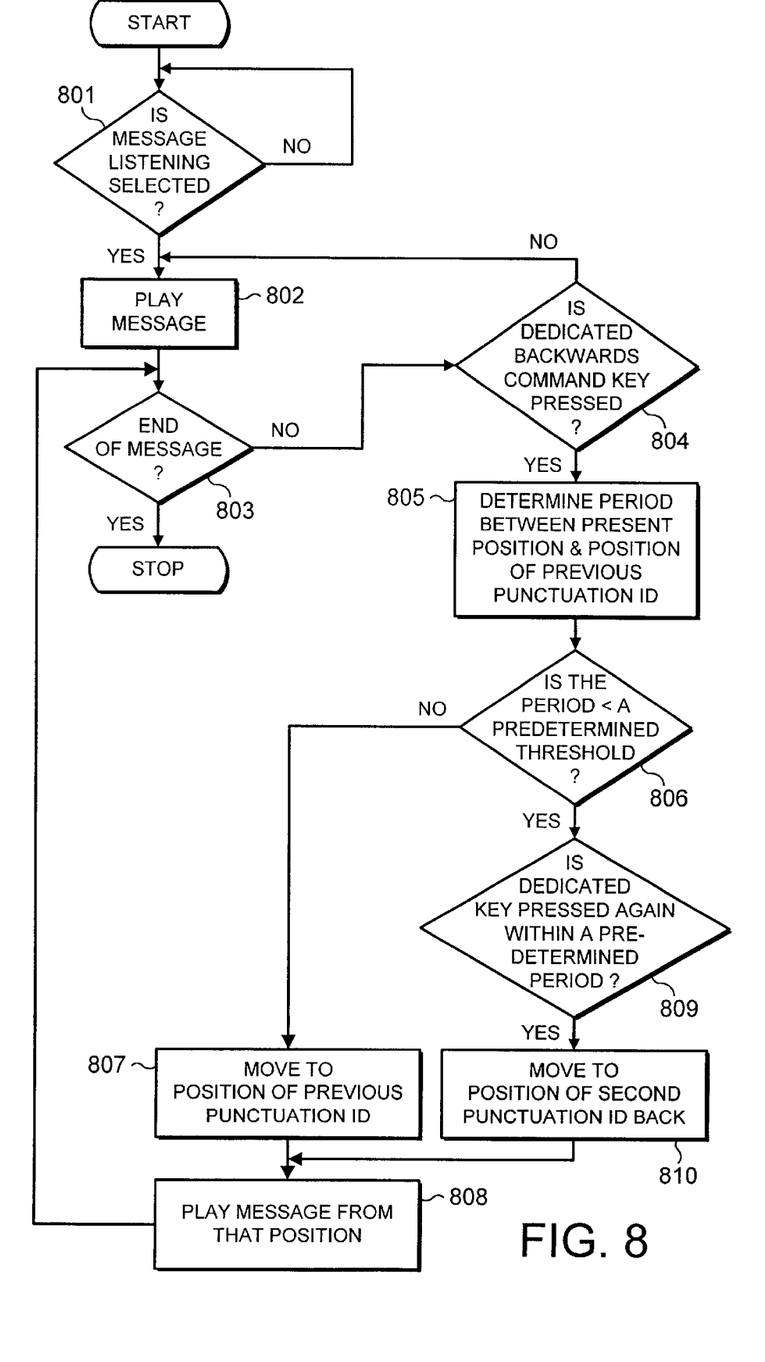
FIG. 8 illustrates a method of repeating text according to a preferred embodiment of the invention.

FIG. 8 illustrates a method of repeating text according to a preferred embodiment of the present invention.

The controller 48 determines whether the user has selected the message listening option (step 801). If this is the case, the controller 48 reads the text data from the memory 47 and controls the TTS engine to play the stored message (step 802). While the message is being played, the controller checks for a backwards command from the user (step 804). If no command is detected then the controller continues to forward the message to the TTS until the end of the message is reached (step 603). Then playing is stopped.

If, on the other hand, the controller detects a backwards command input it then goes on to determine whether a dedicated key is pressed (step 805).

The controller is arranged to control playback from an earlier punctuation identifier if the first identifier back from the position at the time of the backward command is close to that position and the user inputs the further backward command within a certain time frame from the first command. This is achieved by the controller comparing the period between the present position and the position of the previous punctuation identifier (step 805) in response to the detection of the pressing of the dedicated key (step 804), and then checking whether the key is pressed again within a certain period (for example, two seconds from the previous key press) (step 809). If this is the case, then the controller moves to the position of the second punctuation identifier back from the current position (step 810). Alternatively, if either the period between the present position and position of the previous punctuation identifier is not less than the threshold (step 806) or the key is not pressed again within the predetermined period from the first key press (step 810), the controller moves to the position of the previous punctuation identifier from the current position. In either case, the controller reads the message from the appropriate punctuation identifier from the memory and forwards the message from that point to the input of the TTS engine for output (step 808).

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention. For example, while the examples show a mobile communications environment, the invention is equally applicable to other environments. In short, the invention would apply to any text-to-speech service. One such case, is the invention's application running on a Telco Service-server connected to a PSTN and accessed using a phone such as a mobile phone. Speech synthesis could then be controlled using DTMF tones.

What is claimed is:

1. A wireless electronic device comprising:
    a speech synthesizer including a loudspeaker, arranged to convert an input dependent upon punctuated text, to an audio output representative of a human vocally reproducing the punctuated text;
    a user input device for inputting instructions to navigate through the punctuated text, between positions defined by punctuation identifiers of the punctuated text, to a desired position; and
    a controller arranged to control navigation to the desired position, and provide the speech synthesizer with an input corresponding to a portion of the punctuated text from the desired position, in response to input navigation instructions.

2. A device as claimed in claim 1, further comprising a display for displaying the punctuated text.

3. A device as claimed in claim 1, arranged to navigate backward through the punctuated text.

4. A device as claimed in claim 3, wherein the controller is arranged to navigate backwards to a position defined by a predetermined punctuation identifier in response to an input to the user input device.

5. A device as claimed in claim 4, wherein the controller is arranged to navigate backwards to a position defined by the first punctuation identifier in the backwards sequence.

6. A device as claimed in claim 5, further comprising means for determining the length of Punctuated text and/or length of time for audible reproduction of the punctuated text between the current position and the position defined by the first punctuation identifier in the backwards sequence and, if the length is below a threshold, the controller is arranged to navigate backwards to a position defined by a second punctuation identifier in the backwards sequence.

7. A device as claimed in claim 5, wherein the controller controls the speech synthesizer to provide an audio output from the punctuated text between the current position and the position defined by the predetermined punctuation identifier at a slower speed than a default speed.

8. A device as claimed in claim 4, wherein the controller is arranged to navigate backwards to a position defined by the second punctuation identifier in the backwards sequence.

9. A device as claimed in claim 8, further comprising means for determining the length of punctuated text and/or length of time for audible reproduction of the punctuated text between the current position and the position defined by the first punctuation identifier in the backwards sequence and, if the length is below a threshold, the controller is arranged to navigate backwards to a position defined by a second punctuation identifier in the backwards sequence.

10. A device as claimed in claim 8, wherein the controller controls the speech synthesizer to provide an audio output from the punctuated text between the current position and the position defined by the predetermined punctuation identifier at a slower speed than a default speed.

11. A device as claimed in claim 4, further comprising means for determining the length of punctuated text and/or length of time for audible reproduction of the punctuated text between the current position and the position defined by the first punctuation identifier in the backwards sequence and, if the length is below a threshold, the controller is arranged to navigate backwards to a position defined by a second punctuation identifier in the backwards sequence.

12. A device as claimed in claim 11, wherein the controller controls the speech synthesizer to provide an audio output from the punctuated text between the current position and the position defined by the predetermined punctuation identifier at a slower speed than a default speed.

13. A device as claimed in claim 4, wherein the controller controls the speech synthesizer to provide an audio output from the punctuated text between the current position and the position defined by the predetermined punctuation identifier at a slower speed than a default speed.

14. A device as claimed in claim 3, wherein the controller controls the speech synthesizer to provide an audio output from the punctuated text between the current position and the position defined by the predetermined punctuation identifier at a slower speed than a default speed.

15. A device as claimed in claim 14, wherein the default speed is that of the display of the punctuated text on the display.

16. A device as claimed in claim 14, wherein the default speed is the default speed of the audio output of punctuated text by the speech synthesizer.

17. A device as claimed in claim 2, arranged to navigate backward through the punctuated text.

18. A device as claimed in claim 2, arranged to navigate forward through the punctuated text.

19. A device as claimed in claim 1, arranged to navigate forward through the punctuated text.

20. A device as claimed in claim 19, wherein the controller is arranged to navigate forwards to a position defined by a predetermined punctuation identifier in response to an input to the user input device.

21. A device as claimed in claim 20, wherein the controller is arranged to navigate forwards to a position defined by the first punctuation identifier in the forwards sequence.

22. A device as claimed in claim 21, further comprising:
means for determining the length of punctuated text and/or length of time for audible reproduction of the punctuated text between the current position and the position defined by the first punctuation identifier in the forwards sequence and, if the length is below a threshold, the controller is arranged to navigate forward to a position defined by a second punctuation identifier in the forward sequence.

23. A device as claimed in claim 20, wherein the controller is arranged to navigate forwards to a position defined by the second punctuation identifier in the forwards sequence.

24. A device as claimed in claim 23, further comprising:
means for determining the length of punctuated text and/or length of time for audible reproduction of the punctuated text between the current position and the position defined by the first punctuation identifier in the forwards sequence and, if the length is below a threshold, the controller is arranged to navigate forward to a position defined by a second punctuation identifier in the forward sequence.

25. A device as claimed in claim 20, further comprising means for determining the length of punctuated text and/or length of time for audible reproduction of the punctuated text between the current position and the position defined by the first punctuation identifier in the forwards sequence and, if the length is below a threshold, the controller is arranged to navigate forward to a position defined by a second punctuation identifier in the forward sequence.

26. A device as claimed in claim 1, arranged to navigate forward through the punctuated text in response to a first instruction and backwards through the punctuated text in response to a second instruction.

27. A device as claimed in claim 1, wherein the user input device comprises a key means.

28. A device as claimed in claim 27, wherein the key means is a dedicated navigation instruction key.

29. A device as claimed in claim 28, wherein the control means is arranged to determine the number of key actuations, and determine the position of the punctuation identifier associated with that number of key presses.

30. A device as claimed in claim 27, wherein the key means comprises a multifunction key, and the controller controls the functionality of the multifunction key.

31. A device as claimed in claim 30, wherein one function of the multifunction key is selecting a navigation instruction.

32. A device as claimed in claim 31, wherein the control means is arranged to determine the position of the punctuation identifier associated with the navigation instruction selected by the multifunction key.

33. A device as claimed in claim 32, arranged such that the user inputs the navigation instruction via the user input device.

34. A device as claimed in claim 32, arranged such that the user inputs the navigation instruction via the user input device.

35. A device as claimed in claim 32, arranged such that the user inputs the navigation instruction by way of a voice command.

36. A device as claimed in claim 32, wherein the instruction is a number, and the control means is arranged to determine the position of the punctuation identifier associated with that number.

37. A device as claimed in claim 31, wherein the instruction is a number, and the control means is arranged to determine the position of the punctuation identifier associated with that number.

38. A device as claimed in claim 31, arranged to provide the user with a navigation instruction options menu and for the user to select from the menu using the multifunction key.

39. A device as claimed in claim 38, wherein the instruction is a number, and the control means is arranged to determine the position of the punctuation identifier associated with that number.

40. A device as claimed in claim 31, arranged such that the user inputs the navigation instruction via the user input device.

41. A device as claimed in claim 40, wherein the instruction is a number, and the control means is arranged to determine the position of the punctuation identifier associated with that number.

42. A device as claimed in claim 31, arranged such that the user inputs the navigation instruction by way of a voice command.

43. A device as claimed in claim 42, wherein the instruction is a number, and the control means is arranged to determine the position of the punctuation identifier associated with that number.

44. A device as claimed in claim 30, wherein the instruction is a number, and the control means is arranged to determine the position of the punctuation identifier associated with that number.

45. A device as claimed in claim 1, wherein the user input device comprises a voice recognition device.

46. A device as claimed in claim 45, wherein the instruction is a number, and the control means is arranged to determine the position of the punctuation identifier associated with that number.

47. A device as claimed in claim 1, wherein the punctuation identifiers are one or more selected from punctuation marks, capital letters, spaces, a header of a group of words.

48. A device as claimed in claim 1, wherein the electronic device is a document reader or a portable and/or hand-held communications device.

49. A device as claimed in claim 1 comprising:

a mobile receiver for wirelessly receiving messages including the punctuated text; and wherein the controller is coupled to the receiver.

50. A portable radio communications device comprising:

a speech synthesizer including a loudspeaker, arranged to convert an input dependent upon punctuated text, to an audio output representative of a human vocally reproducing the punctuated text;

a user input device for inputting instructions to navigate through the punctuated text, between positions defined by punctuation identifiers of the punctuated text, to a desired position; and a controller arranged to control navigation to the desired positions and provide the speech synthesizer with an input corresponding to a portion of the punctuated text from the desired position, in response to input navigation instructions.

51. A device as claimed in claim 50, which is a hand-held device.

52. A device as claimed in claim 51, comprising means for mounting in a vehicle.

53. A device as claimed in claim 50, comprising means for mounting in a vehicle.

54. A device as claimed in claim 50 comprising:

a mobile receiver for wirelessly receiving messages including the punctuated text; and wherein the controller is coupled to the receiver.

55. A wireless document reader comprising:

a speech synthesizer including a loudspeaker, arranged to convert an input dependent upon punctuated text, to an audio output representative of a human vocally reproducing the punctuated text;

a user input device for inputting instructions to navigate through the punctuated text, between positions defined by punctuation identifiers of the punctuated text, to a desired position; and a controller arranged to control navigation to the desired positions and provide the speech synthesizer with an input corresponding to a portion of the punctuated text from the desired position, in response to input navigation instructions.

56. A reader as claimed in claim 55 comprising:

a mobile receiver for wirelessly receiving messages including the punctuated text; and wherein the controller is coupled to the receiver.

57. A car comprising:

a wireless electronic device comprising a speech synthesizer including a loudspeaker, arranged to convert an input dependent upon punctuated text, to an audio output representative of a human vocally reproducing the text, a user input device for inputting instructions to navigate through the punctuated text, between positions defined by punctuation identifiers of the punctuated text, to a desired position, and a controller, arranged to control navigation to the desired position, and to provide the speech synthesizer with an input corresponding to a portion of the punctuated text from the desired position, in response to input navigation instructions.

58. A car as claimed in claim 57, wherein the user input device comprises key means on the steering wheel.

59. A car as claimed in claim 57 wherein:

the wireless electronic device includes a mobile receiver for wirelessly receiving messages including the punctuated text and the controller is coupled to the receiver.

60. A method of navigating through punctuated text to a desired position for audio output by a speech synthesizer which is part of a wireless device, the method comprising:

detecting instructions input by a user to navigate through the punctuated text, between positions defined by punctuation identifiers of the punctuated text, to a desired position;

controlling navigation to the desired position; and providing the speech synthesizer with an input corresponding to a portion of the punctuated text from the desired position.

61. A method according to claim 60 comprising:

wirelessly receiving messages with a mobile receiver which include the punctuated text.

62. A method for providing speech synthesis of a desired portion of punctuated text using a wireless device, the method comprising:

determining a desired start position in the punctuated text from a selection defined by punctuation identifiers, from an instruction input by a user;

moving to the desired start position of the punctuated text; and outputting speech synthesized punctuated text from that position.

63. A method according to claim 62 comprising:

wirelessly receiving messages with a mobile receiver which include the punctuated text.

* * * * *